United States Patent
Zhao (10) Patent No.: US 6,993,501 B1
(45) Date of Patent: Jan. 31, 2006

(54) METHOD AND SYSTEM OF COMMUNICATION FOR AUTOMATED INVENTORY SYSTEMS

(75) Inventor: Haiping Zhao, Mountain View, CA (US)

(73) Assignee: DispenseSource, Inc., Rancho Santa Margarita, CA (US)

(*) Notice: Subject to any disclaimer, the term of this patent is extended or adjusted under 35 U.S.C. 154(b) by 423 days.

(21) Appl. No.: 10/100,219

(22) Filed: Mar. 15, 2002

Related U.S. Application Data (60) Provisional application No. 60/276,054, filed on Mar. 15, 2001.

(51) Int. Cl.
*G06F 17/60* (2006.01)

(52) U.S. Cl. ............ 705/28; 700/236; 700/237
(58) Field of Classification Search ........ 705/28, 705/22, 29, 21, 26; 700/231, 236, 237
See application file for complete search history.

(56) References Cited

U.S. PATENT DOCUMENTS

| | | | | |
|---|---|---|---|---|
| 4,412,292 A | * | 10/1983 | Sedam et al. ............ 700/241 |
| 5,207,784 A | * | 5/1993 | Schwartzendruber ......... 221/6 |
| 5,971,273 A | * | 10/1999 | Vallaire ................ 235/381 |
| 6,011,999 A | * | 1/2000 | Holmes ................. 700/231 |
| 6,012,041 A | * | 1/2000 | Brewer et al. ........... 705/28 |
| 6,181,981 B1 | * | 1/2001 | Varga et al. ............ 700/236 |
| 6,341,271 B1 | | 1/2002 | Salvo et al. |
| 6,415,318 B1 | * | 7/2002 | Aggarwal et al. ......... 709/206 |
| 6,418,416 B1 | | 7/2002 | Rosenberg et al. |
| 6,601,037 B1 | * | 7/2003 | Kolls .................. 705/14 |

FOREIGN PATENT DOCUMENTS

JP            410247982 A   *   9/1998

OTHER PUBLICATIONS

Kelsey, Dick. Coke Drops Heavy Coin Into Marconi Smart Vending, May 17, 2000. Company Business and Marketing.*

* cited by examiner

*Primary Examiner*—James S. McClellan
(74) *Attorney, Agent, or Firm*—Knobbe Martens Olson & Bear LLP (57) ABSTRACT

Various embodiments of this invention are directed towards the communication infrastructure of an automated inventory system, on which the necessary communication between a dispensing unit and an administrative unit of the system occurs. To facilitate the integration of the automated inventory system into the client's computer network, the infrastructure is preferably implemented using hypertext transfer protocol (http) or its secured counterpart (https). In certain embodiments the administrative unit is located external to the client's network, beyond the client's firewall. In these embodiments it is preferable to have the dispensing unit initiate communication with the administrative units because the firewall is typically setup to reject external connection requests.

1 Claim, 6 Drawing Sheets

METHOD AND SYSTEM OF COMMUNICATION FOR AUTOMATED INVENTORY SYSTEMS

This application claims priority under 35 U.S.C. § 119(e) to U.S. Provisional Application No. 60/276,054 filed on Mar. 15, 2001 and titled INTERNET COMMUNICATION METHOD FOR DISPENSING SYSTEMS, the entirety of which is incorporated herein by reference.

BACKGROUND OF THE INVENTION

1. Field of the Invention

This invention relates generally to a method and system of communication system. Specifically, the embodiments of this invention are directed towards ion infrastructure of an automated inventory system.

2. Description of the Related Art

In most industrial operations, supplies are stored in centrally located storerooms, tool cribs or lockers. These supplies are manually requisitioned and taken to a work area to be used. The removal of these supplies is later input into an inventory system, often manually. Due to the inherent lag between removal and input, the inventory data is rarely up-to-date.

Thus frequently supplies that appear to be available on the inventory system may actually have been already used. When supplies reach critically low levels, they have to be reordered on an expedited or emergency basis, often at a premium, to minimize disruption of the work flow. The alternative is to maintain inventory at an unnecessarily high level, which increases overhead costs and decreases cash flow.

As long as inventory data is updated in an auditing manner, i.e., post use, it cannot reflect the actual availability of supplies. This shortcoming is exacerbated by increases in the turnover rate of supplies. When the turnover of supplies is slow compared to the lag, the probability of critical shortages is small. However, as the turnover of supplies increases, so does the lag because more inventory data has to be input, thereby increasing the likelihood that supplies that appear as available on the inventory system have already been used. Thus the frequency of critical shortages also increases.

SUMMARY OF THE INVENTION

To eliminate the lag, inventory data may be updated at the point-of-use. As doing so manually is too cumbersome, an automated inventory system that captures inventory data at the point-of-use, i.e. when supplies are removed, is desirable. In such an automated inventory systems, a user enters his user id (and optionally a password) into a dispensing unit, which records the quantity of supplies taken by him and automatically updates inventory data. Point-of-user information provides an additional advantage in allowing user efficiency and waste to be tracked.

The viability of such an automated inventory system often hinges upon the convenience of using its dispensing units. If doing so is inconvenient, users will hoard or stockpile supplies to minimize the inconvenience. This leads to an opposite problem, in which supplies that appear to be used or unavailable on the inventory system are actually available, albeit at an unknown location. Once again, the maintenance of inventory at an unnecessarily high level increases overhead costs and decreases cash flow.

As the area of a workspace increases, a centralized dispensing unit becomes more inconvenient for more users. Thus, multiple decentralized dispensing units are necessary to maintain user convenience and the viability of an automated inventory system. However, the administration of an automated inventory system becomes more difficult with the addition of dispensing units, as inventory data has to be transferred and consolidated, for administrative purposes. This may be achieved via the communication infrastructure of the automated inventory system. Commonly, this communication infrastructure is proprietary, and thus expensive to implement and maintain.

Various embodiments of this invention are directed towards the communication infrastructure of an automated inventory system, on which the necessary communications between dispensing units and administrative units occur.

In one embodiment the automated inventory system comprises an administrative unit and a dispensing unit. Various information about users, items and transactions are transferred between the two units. User information may include user id, password, and access rights. Item information may include alias, quantity, location, cost and inventory management levels. Transaction information may include user, account billed to, item and quantity.

In some embodiments, a dispensing unit limits supplies available to a user according to his access rights. These limits may be based on the item, quantity, cost, time or other variables and combinations of variables.

In some embodiments events are triggered when the quantity of an item approaches, reaches or falls below an amount defined as an inventory management level associated with that item. In one of these embodiments, a message regarding the shortage of the item is generated. In another one of these embodiments, if an item is unavailable in a first dispensing unit, the administrative unit survey the availability of that item on other dispensing units, and sends a message to the first dispensing unit advising its user of that item's availability on other dispensing units. In this embodiment user access rights may be temporarily modified during the unavailability of an item at a dispensing unit. In yet another one of these embodiments, the item is automatically reordered from its vendor.

In one embodiment user information may be added, changed or deleted only from an administrative unit. In another embodiment user information may be added, changed or deleted on a dispensing unit adapted for such administrative functions.

In some embodiments all the information to be transferred from an administrative unit to a dispensing unit is stored in a first file, and all the information to be transferred from a dispensing unit to an administrative unit is stored in a second file, to facilitate the two transfers. In one of these embodiments, the first file is transferred before the second, while in another one of these embodiments, the order in which the files are transferred is set from the administrative unit.

In some embodiments, other files such as the communication configuration file or the error log file are transferred between an administrative unit and a dispensing unit. In one of these embodiments the error log file is downloaded from the dispensing unit to the administrative unit for analysis following the transfer of regular user, item and transaction data. In another one of the these embodiments, the communication configuration file is uploaded from the administrative unit to the dispensing unit to reset or update the parameters of their communication. These parameters may include IP addresses and transfer intervals.

In some embodiments the communication infrastructure is implemented using the hypertext transfer protocol (http) or its secured counterpart (https). These embodiments are preferred over implementations using traditional ftp, as http implementations are more secure. This makes http based communication infrastructure compatible with client networks having stringent security protocols. A http based communication infrastructure may be integrated into the client's own computer network, reducing cost of implementation and maintenance.

In one embodiment the communication infrastructure comprises the client's own LAN, WAN, or intranet. In this embodiment communication between an administrative unit and a dispensing unit can be initiated from either unit. In another embodiment the communication infrastructure comprises the Internet. As the administrative unit is located beyond the client's firewalls and proxies, communication between an administrative unit and a dispensing unit is preferably initiated by the dispensing unit, to comply with the client's network security restrictions. Frequent communication between the dispensing unit and the administrative unit will advantageously generate an approximately real time inventory picture at the administrative unit, even though the communication may be initiated by the dispensing unit.

In this embodiment the administrative unit can be managed by the vendor of supplies, who is responsible for restocking the dispensing units, to achieve instant delivery e-commerce.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENT

Figure 1:
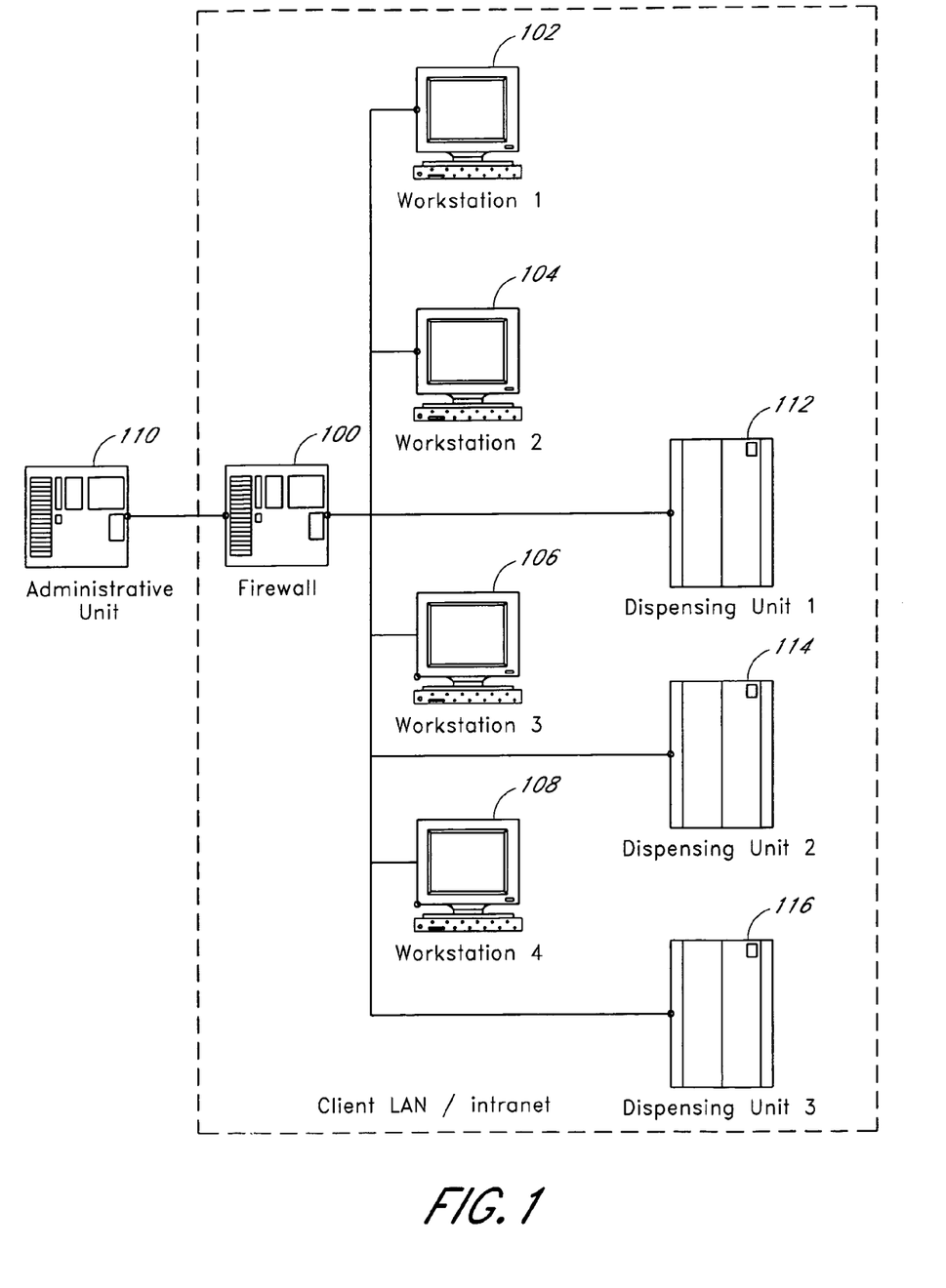
FIG. 1 is a network diagram showing an automated inventory system integrated into a client's own network (LAN/intranet) in one embodiment of this invention.

FIG. 1 is a network diagram showing an automated inventory system integrated into a client's own network (LAN/intranet) in one embodiment of this invention. The client network originally comprises of a firewall 100, and four workstations 102, 104, 106, and 108, before the implementation of the automated inventory system. The automated inventory system comprises of an administrative unit 110, and three dispensing units 112, 114 and 116. The automated inventory system uses the client network as part of its communication infrastructure. The dispensing units 112, 114, and 116 are connected to available ports on the client network. The administrative unit 110 is connected to the client network via the Internet, and is thus located beyond the firewall 100.

Each dispensing unit has at least one bin, tray, or other compartment adapted to store supplies. The setup of the compartments depend on the supplies to be dispensed and the environment in which the dispensing unit is used in. For example, the dispensing unit maybe used in offices, hospitals, manufacturing operations, etc. Usually, each compartment stores a single type of item. To access the supplies in the dispensing unit, a user first identifies himself. This may be accomplished in many ways, including but not limited to, user id (and password, optionally) entry, key cards or other electronic identification, fingerprint and iris scanning. As the user removes supplies from the dispensing unit, it tracks the quantities of items removed. There are many ways to do so, including but not limited to, compartments adapted to count and dispense a quantity input by the user, compartments programmed to dispense a preset quantity, and weight-sensitive compartments that senses the change in weight after a user removes supplies. An exemplary dispensing unit is disclosed in U.S. application Ser. No. 10/008,612, the entirety of which is herein incorporated by reference. Optionally the user may enter one or more accounts to which the costs of the supplies removed are to be billed. The transaction information thus collected needs to be periodically sent to the administrative unit.

For security, the firewall 100 is often set to reject connection requests originating from outside the client network, with the exception of e-mail. For example, if the administrative unit 110 attempts to connect to the dispensing unit 112, i.e. by polling, this connection request will be rejected by the firewall 100. Thus it is desirable to have the dispensing unit, for example, 112, initiate the connection to the administrative unit 110. To the firewall 100, this is equivalent to a user accessing the Internet from a workstation, for example, 102. This connection may be via the hypertext transfer protocol (http) or its secured counterpart (https).

After connection, the administrative unit 110 can upload files to, and download files from, a dispensing unit, for example, 112, as though connected via the traditional file transfer protocol (ftp). These files include the regular incoming and outgoing (from viewpoint of dispensing unit) files with information on users, items and transactions. These files may also include error log files, communication configuration files, and dispensing unit executable files. The administrative unit 110 can also execute commands on the dispensing unit, for example, rebooting the dispensing unit. These commands are sent to the dispensing unit in a file during the file transfer, and contain parameters recognized as commands by the program running on the dispensing unit.

The administrative unit 110 has an interface for an administrator to perform all the above functions. Other functions available on this interface may include adding, changing and deleting users and dispensing units. The administrative unit 110 also keeps a connection log from each dispensing unit. In some embodiments events are triggered by an aberrant dispensing unit, one which has not communicated with the administrative unit 110 over a preset period of time. In one of these embodiments a message is dispatched to the administrator advising him to physically check on the aberrant dispensing unit. In another one of these embodiments the administrative unit 110 may prioritize the next connection attempt from the aberrant dispensing unit.

Figure 2:
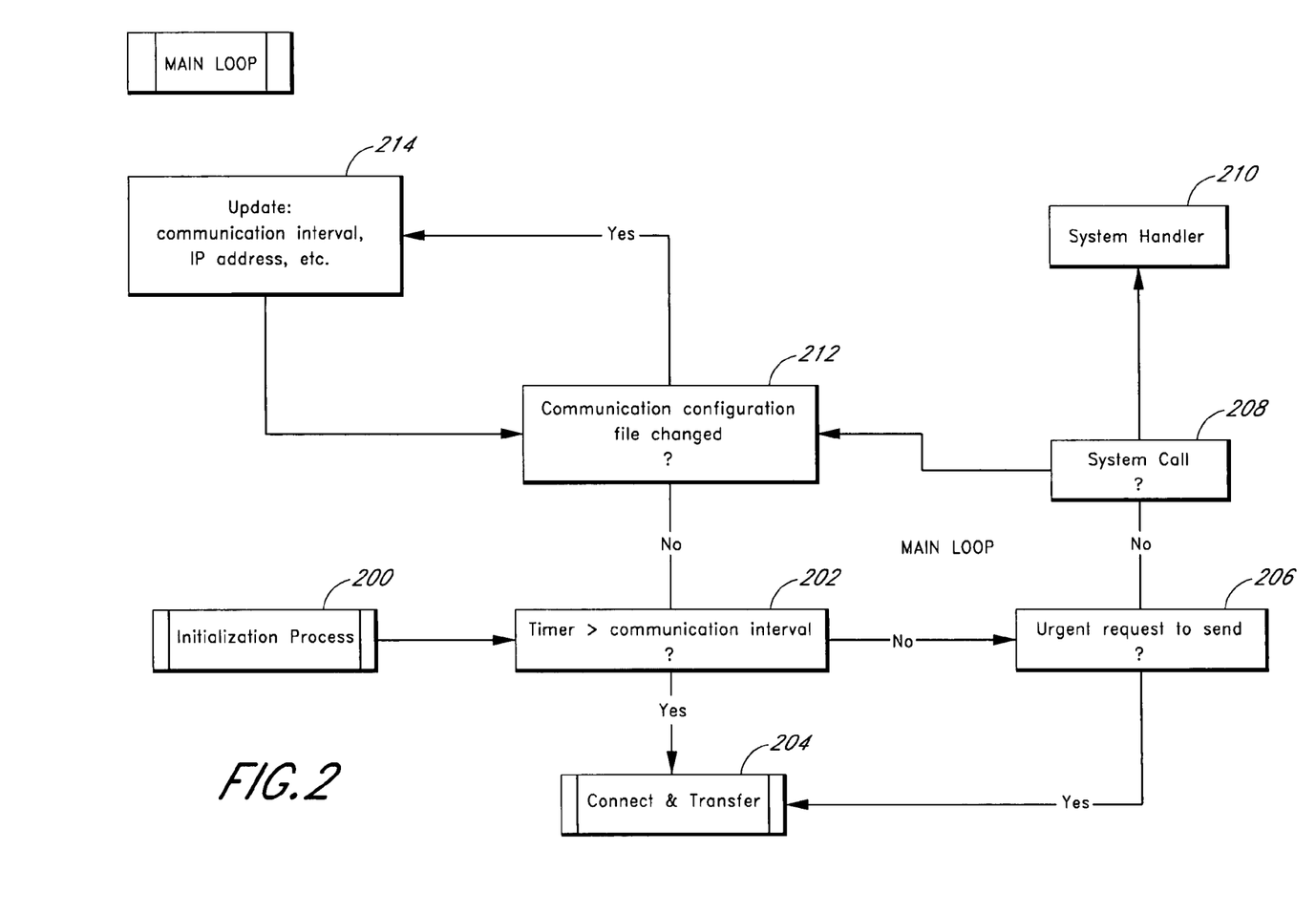
FIG. 2 is an overview flowchart of the program running on a dispensing unit.

FIG. 2 is an overview flowchart of the program running on a dispensing unit. Following an initialization step 200, the program determines in step 202 whether it is time to connect to the administrative unit, by comparing a timer value to the communication interval. If so, it connects to the administrative unit in step 204 and transfer files. If not, it next determines in step 206 whether the file transfer request is urgent. If it is urgent, the program loops back to step 204. Step 208 represents an interrupt at which the program may be terminated, passing control back to the system handler in step 210. In step 212 the dispensing unit determines if the communication configuration file has changed. If so it updates the changed communication parameters, such as the communication interval or the administrative unit's IP address, in step 214. The program runs in a loop, labeled the MAIN LOOP, defined by steps 202, 206, 208 and 212.

Figure 3:
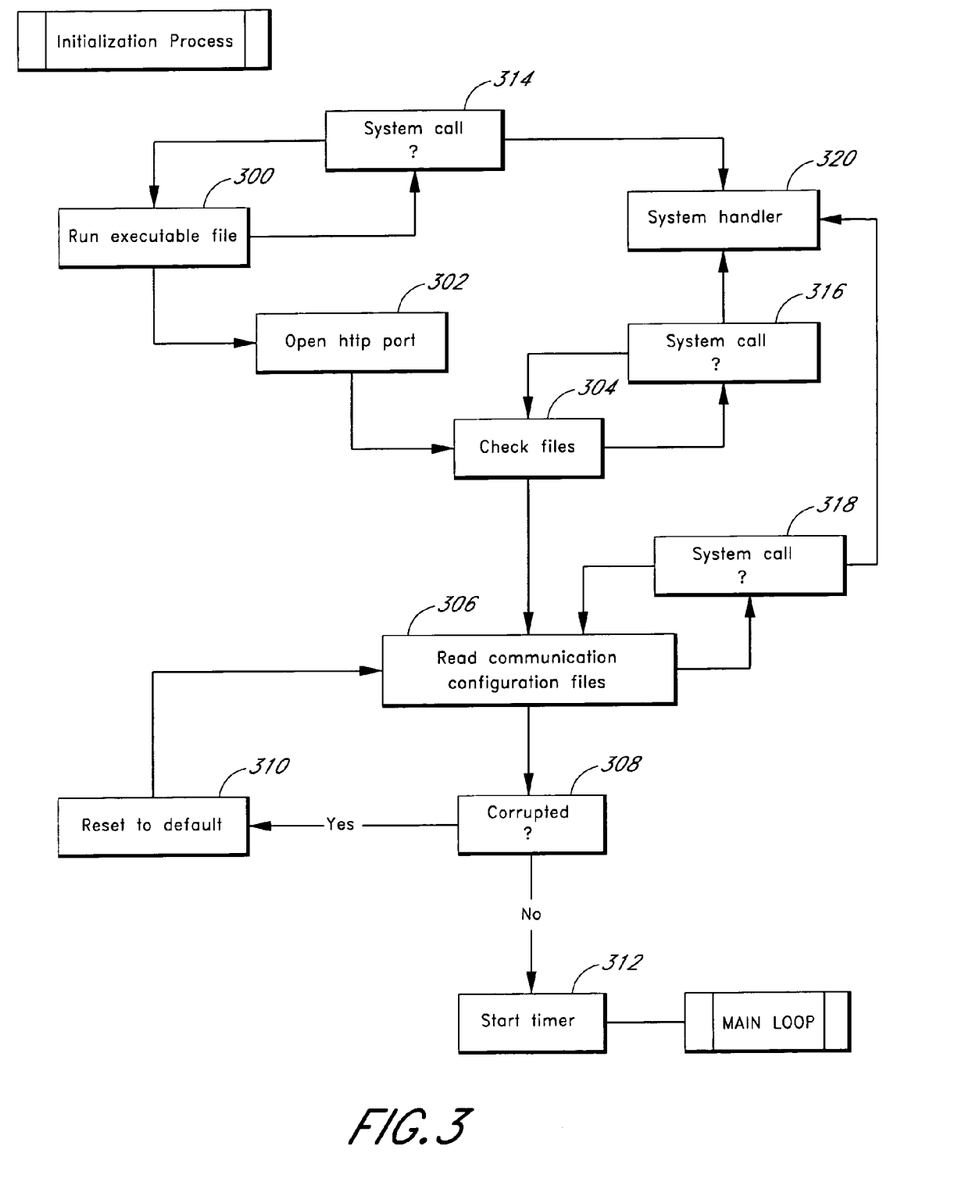
FIG. 3 is a detailed flowchart of step 202, the initialization step, in FIG. 2.

FIG. 3 is a detailed flowchart of step 202 in FIG. 2. The executable file containing the program is run in step 300. In step 302, the program opens a http port. In step 304 it checks the integrity of the files on the dispensing unit. In step 306 it reads the communication configuration file of the dispensing unit, and determines if the file is corrupted in step 308. If so; the file is reset with default communication parameters in step 310. In step 312, the timer is started, and the program returns to the MAIN LOOP. Steps 314, 316, and 318 are points at which the program may be terminated, passing control back to the system handler in step 320.

Figure 4:
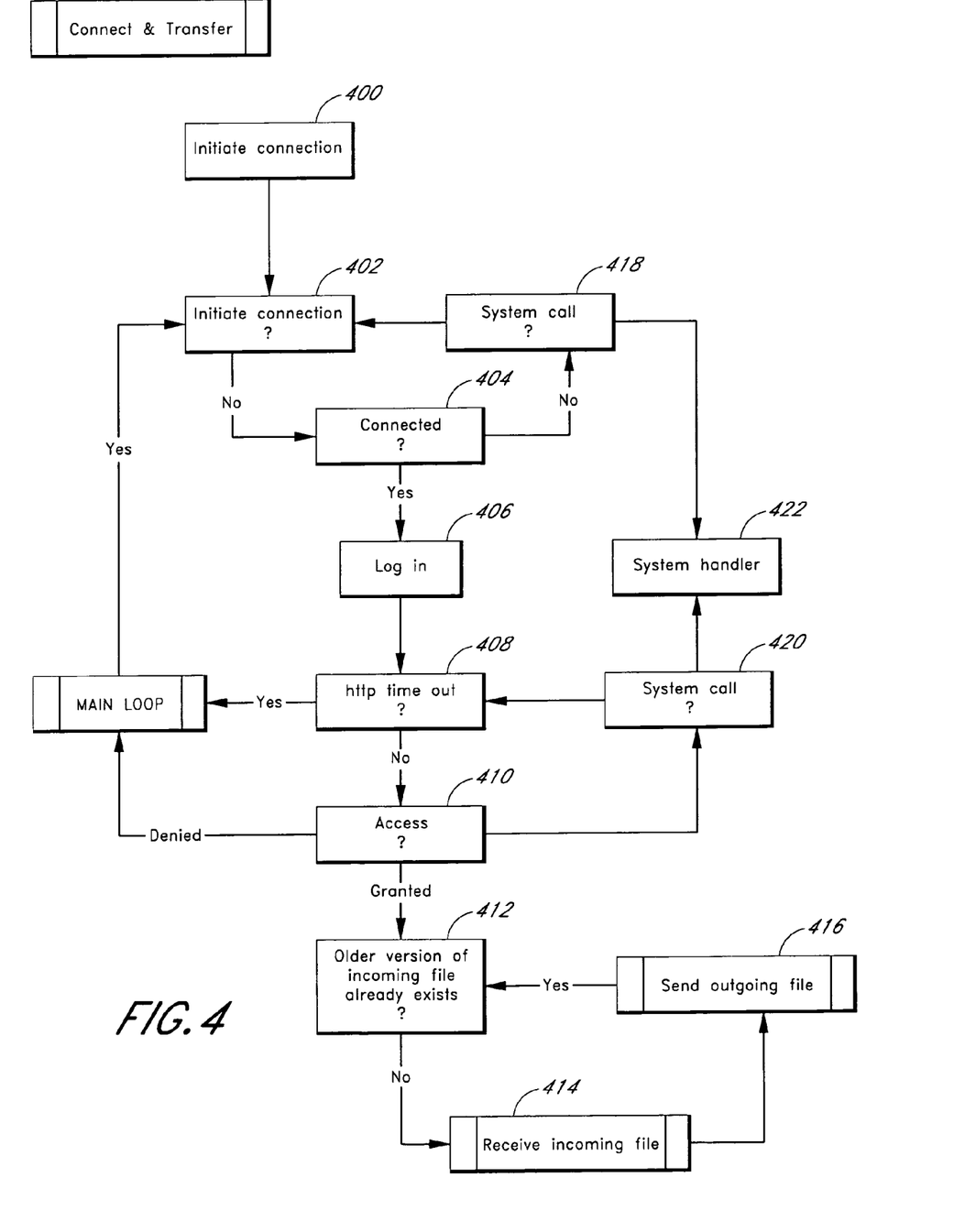
FIG. 4 is a detailed flowchart of step 204, the connect and transfer step, in FIG. 2.

FIG. 4 is a detailed flowchart of step 204 in FIG. 2. The program initiates the connection to the administrative unit in step 400. In step 402 the program determines whether the connection has timed out. If so the program returns to the MAIN LOOP. In step 406 the program attempts to log into the administrative unit. In step 408 the program determines whether the connection has timed out. If so the program returns to the MAIN LOOP. In step 410 the program determines whether it has access to the administrative unit. If access is denied the program returns to the MAIN LOOP. If access is granted the program next determines in step 412 whether an older version of the incoming file already exists. If not the incoming file is received in step 414. If an older version of the incoming files exists in step 412, that means it has not been processed by the dispensing unit, and program skips step 414. In step 416 the outgoing file is sent to the administrative unit. Steps 418 and 420 are points at which the program may be terminated, passing control back to the system handler in step 422.

Figure 5:
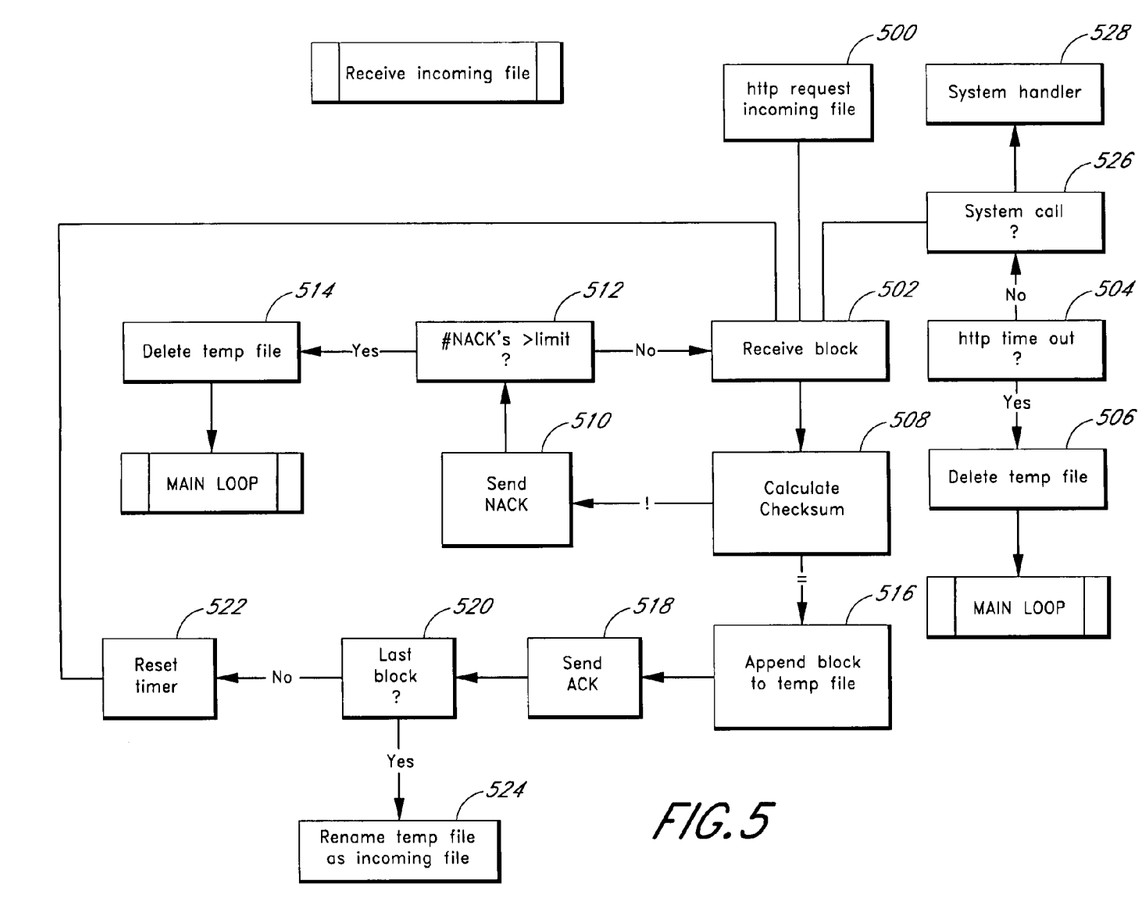
FIG. 5 is a detailed flowchart of step 414, the receive incoming file step, in FIG. 4.

FIG. 5 is a detailed flowchart of step 414 in FIG. 4. In step 500 the program sends a http request to the administrative unit for the incoming file. In step 502 the dispensing unit receives a block of the incoming file. If the connection times out, as represented by step 504, the temp file storing the blocks received so far is deleted in step 506 and the program returns to the MAIN LOOP. In step 508 the checksum is calculated for error correction. If there is an error a NACK is sent to the administrative unit in step 510. If the number of NACK's exceeds a predetermined limit in step 512, the temp file storing the blocks received so far is deleted in step 514 and the program returns to the MAIN LOOP. If there is no error after the checksum is calculated in step 508 the received block is appended to the temp file in step 516 and an ACK is sent to the administrative unit in step 518. In step 520 the program determines whether the received block is the last block of the incoming file. If not the timer is reset in step 522 and the program loops back to step 502. If the last block of the incoming file has been received, the temp file is renamed to the incoming file in step 524. Step 526 represents an interrupt at which the program may be terminated, passing control back to the system handler in step 528.

Figure 6:
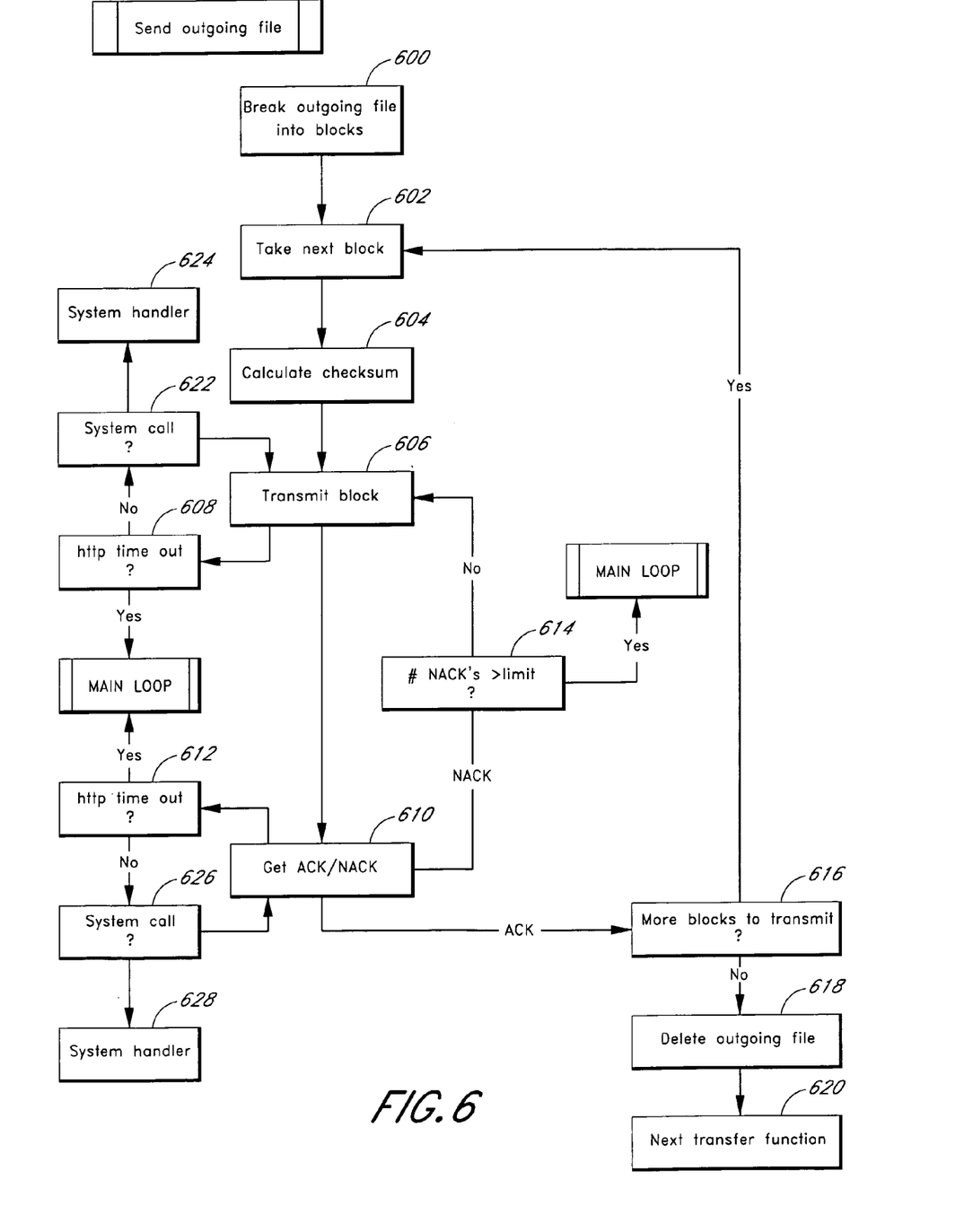
FIG. 6 is a detailed flowchart of step 416, the send outgoing file step, in FIG. 4.

FIG. 6 is a detailed flowchart of step 416 in FIG. 4. In step 600 the outgoing file is broken down into blocks. The next block is determined in step 602 and a checksum for error correction is calculated in step 604. In step 606 this block is transmitted to the administrative unit. If the connection times out, as represented by step 608, the program returns to the MAIN LOOP. The program requests an acknowledgement from the administrative unit in step 610. Once again, if the connection times out, as represented by step 612, the program returns to the MAIN LOOP. If a NACK is received in step 610, the program determines if the number of NACK's exceeds a predetermined limit in step 614. If so, the program returns to the MAIN LOOP. If an ACK is received in step 610, the program determines whether there are more blocks to transmit in step 616. If so the program loops back to step 602. If there are no more blocks to transmit in step 616, the outgoing file is deleted in step 618 and the program determines whether there are other files to be transferred to the administrative unit in step 620. For example, the administrative unit may request that the error log file from the dispensing unit be transferred. Steps 622 and 626 are points at which the program may be terminated, passing control back to the system handler in steps 624 and 628, respectively.

While certain embodiments of the inventions are described above, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the invention.

What is claimed is:

1. An automated inventory system, comprising:

a plurality of controlled-access dispensing units containing inventory supply items, each of said dispensing units located at a client facility of at least one client, each of said dispensing units comprising a user interface configured to permit a user to enter identification information into said system, each of said dispensing units configured to restrict access to only an approved portion of the supply items in accordance with predetermined access rights corresponding with said identification information of said user, each of said dispensing units configured to maintain transaction information regarding a quantity and a description of the supply items dispensed in connection with a particular transaction;

wherein each of said plurality of dispensing units is configured to communicate with an administrative unit disposed at a location outside of said client facility through a communication connection comprising a client network and the internet, wherein said administrative unit is connected to an administrative network controlled by an administrative entity other than the client, wherein said client network comprises a client firewall regulating communication between the client network and the internet, said client firewall configured to allow requests for connection to the internet originating from within said client network and to reject connection requests originating from the administrative unit;

wherein each of said plurality of dispensing units are configured initiate communication with said administrative unit after the expiration of a predetermined time interval since a previous communication with said administrative unit and to send transaction information for one or more transactions that have occurred during said time interval to said administrative unit such that said administrative unit may compile inventory information for an aggregate inventory of said supply items within said plurality of dispensing units at said client facility;

wherein said initiation of communication by said dispensing unit is configured to occur without a related communication request from said administrative unit and wherein said administrative unit is configured to maintain a connection log containing information relating to a series of communication connections between said administrative unit and each of said dispensing units, said administrative unit configured to generate a message for an aberrant one of said dispensing units which has not initiated communication with said administrative unit for a predetermined non-communication period.

* * * * *